United States Patent [19]

Main

[11] 4,003,610
[45] Jan. 18, 1977

[54] TERMINAL HOUSING

[75] Inventor: Harold M. Main, Muncie, Ind.

[73] Assignee: General Cable Corporation, Greenwich, Conn.

[22] Filed: Feb. 18, 1975

[21] Appl. No.: 550,296

[52] U.S. Cl. .............................. 312/100; 312/284; 312/324; 312/272; 220/263
[51] Int. Cl.² ..................................... A47B 81/00
[58] Field of Search .......... 312/100, 324, 290, 120, 312/284, 215, 272; 220/263, 264

[56] References Cited

UNITED STATES PATENTS

| 1,365,686 | 1/1921 | Harvey | 220/263 |
|---|---|---|---|
| 2,071,486 | 2/1937 | Wright | 220/263 |
| 2,242,720 | 5/1941 | Froelich | 312/284 |
| 2,939,297 | 6/1960 | Karger et al. | 312/100 |
| 3,330,612 | 7/1967 | Masterson et al. | 312/290 |
| 3,365,535 | 1/1968 | Wilk | 312/100 |
| 3,376,086 | 4/1968 | Fisher | 312/100 |
| 3,822,659 | 7/1974 | Maag | 312/324 |
| 3,860,307 | 1/1975 | Fostel | 312/324 |

FOREIGN PATENTS OR APPLICATIONS

| 358,757 | 6/1921 | Germany | 220/263 |
|---|---|---|---|
| 8,910 | 4/1899 | United Kingdom | 312/272 |
| 4,921 | 1910 | United Kingdom | 220/264 |

Primary Examiner—Paul R. Gilliam
Assistant Examiner—Victor N. Sakran
Attorney, Agent, or Firm—Jenkins, Hanley & Coffey

[57] ABSTRACT

A terminal housing has top and bottom walls shaped as inverted pans, which support between them a forwardly-arched arrangement of terminal block panels providing a rear cable-connection space and a front service-connection face. A peripherally-continuous side-wall enclosure includes two doors which are hinged adjacent the rear of the panel arch and extend forward and across into overlapping relation at the front. A cap or cover having a depending peripheral flange is supported above the top wall by springs in a normally raised position in which it clears the doors and allows them to swing open. A manual actuating lever swings forward below the bottom wall and actuates linkage to move the cap downward to a closed position in which its peripheral flange overlaps the top edges of the doors to secure them closed. A latch finger on the actuating lever engages the edges of the doors to secure them closed at the bottom. The lever is padlocked in closed position.

4 Claims, 7 Drawing Figures

TERMINAL HOUSING

BACKGROUND OF THE INVENTION

This invention relates to a terminal housing of relatively large size, adapted to be mounted above ground and to contain a forwardly-arched arrangement of terminal boards which provide a large number of cable connections, for example, cross connections of up to 1800 pairs of telephone wires.

Such terminal housing must provide good protection against tampering and vandalism, and good weather protection, yet extremely large areas of its side-walls must open to provide access to the terminal blocks mounted in the housing. It is desirable to present the rear faces of the terminal blocks to a cable-connection space at the rear of the housing which normally requires access only during cable installation and major modifications, and to present the front faces of the terminal blocks at a front service-connection face which is easily accessible at any time, independently of the rear cable-connection space.

The present invention provides a terminal housing having a rear cable-connection space which is accessible for cable-connection service but is otherwise normally closed, and a front service-connection face which is readily accessible through a pair of large doors which extend entirely across the front of the housing and most of the way across the end faces of the housing. In combination with such wide and large doors, and in spite of their large size, the housing provides good weather protection and high security against tampering.

SUMMARY OF THE INVENTION

In accordance with the invention, the housing is mounted on a base through which cables are brought to it, and is formed on top and bottom structural walls, conveniently shaped as inverted pans, interconnected by structural uprights, some of which may also serve as side-wall sections. The structure is arranged to support between the top and bottom walls a forwardly-arched arrangement of terminal block panels which provides at the rear and within the arch a rear cable-connection space, and at the front and on the outside of the arch a front service-connection face. The bottom wall contains a rear cut-out within the arch to form a cable entrance from the base. The inside of the arch is accessible through a rear closure panel or door which may be closed in a more-or-less permanent manner, as by riveting, after the cable connections have been installed. The front and most of the end faces of the housing are open to provide open and free access to the front of the forwardly-arched arrangement of terminal block panels, and are closed by wide angular doors hinged to the housing structure adjacent the rear of the panel arch and which when closed extend forward across the end faces of the housing and then toward each other across the front of the housing into overlapping relation at the center of such front. A cap or top cover having an impervious cover wall and a depending peripheral flange is mounted above the top structural wall of the housing and guided for vertical movement between a raised position in which it clears the doors and allows them to swing open and closed, and a lowered position in which its peripheral flange overlaps the top edges of the closed doors to secure them in a closed position. The cap is moved between its two positions by a manual-actuating lever, and such lever desirably has a securing position in which it overlies the lapped edges of the two doors and can be locked as by a padlock. Preferably, the cap is normally held in its raised position by supporting springs, and is moved downward to its closed position by linkage connected to the manual actuating lever disposed below the bottom wall of the housing. The manual lever desirably actuates a latch to a closed position in which it secures the bottom edges of the doors in closed position. Such latch may be a finger carried by the actuating lever.

BRIEF DESCRIPTION OF THE DRAWINGS

The accompanying drawings illustrate the invention and show a preferred embodiment. In such drawings.

DESCRIPTION OF THE SPECIFIC EMBODIMENT

Figures 1, 2:
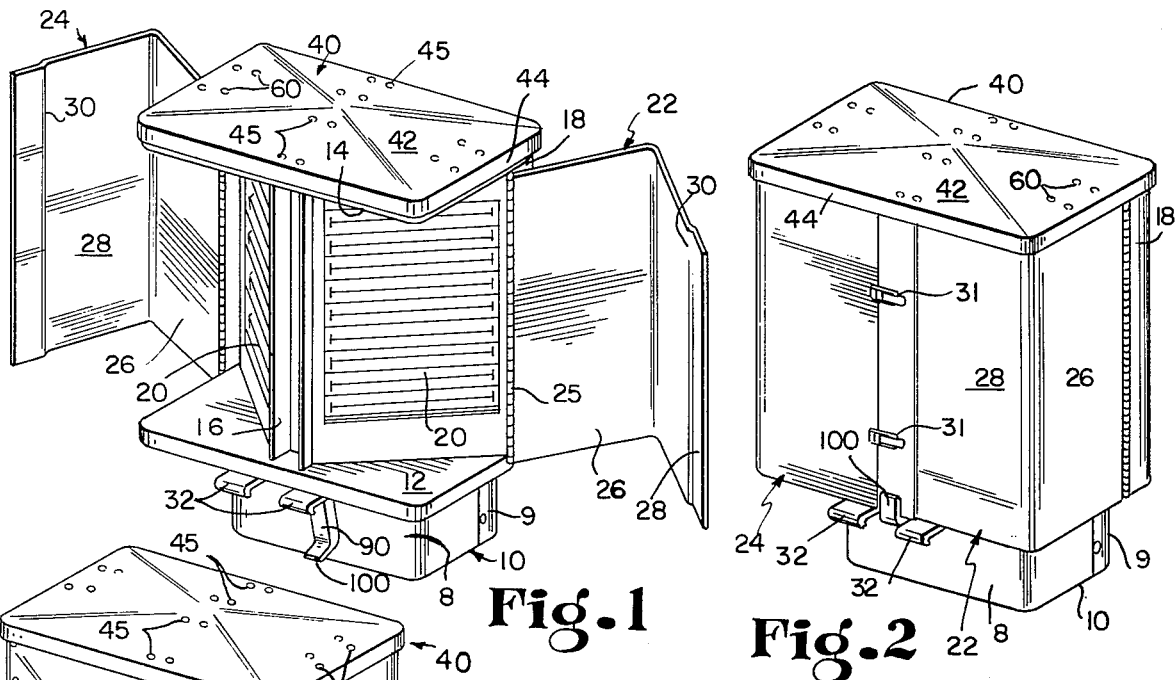
FIG. 1 is an isometric view of a terminal housing in accordance with the invention, shown with the cap in raised position and with the doors open.
FIG. 2 is an isometric view of the terminal housing of FIG. 1, shown with the doors closed and the cap in lowered position over their top edges.

The terminal housing shown in the drawings is a generally rectangular box-like structure supported by a base 10. The base includes front and rear housings 8 and 9, and may be mounted on a concrete pad or by stakes in a conventional manner. The housing comprises a lower structural plate member conveniently in the form of an inverted pan 12, and an upper structural plate member conveniently in the form of an inverted pan 14. The two pans 12 and 14 are structurally interconnected by suitable uprights which as shown in FIG. 1 comprise a central front upright 16 and two rear corner wall sections 18. This structure supports a plurality of terminal block panels 20 shown in FIG. 1 as two in number arranged in a forwardly-arched V-configuration, with their front edges connected to the front upright 16 and their rear edges connected to the rear corner uprights 18. The entire front and most of the end faces of the housing are open to expose the front service-connection faces of the terminal panels 20. Two angular doors 22 and 24 are provided for closing these open sides of the housng, and are connected by continuous hinges 25 to the front edges of the rear corner uprights 18. This locates the hinges substantially at the rear of the panel arch and gives full access to the front service face of the terminal panels when the doors are swung open as shown in FIG. 1. The doors each have an end wall section 26 which in the closed positions of the doors extend forward from the hinges 25 to close the end face of the housing, and a front wall section 28 which in the closed position of the doors extends across the front of the housing. The two door edges are desirably overlapped, and may be provided adjacent their edges with reinforcing offsets or ribs 30.

Optionally, the door edges may be pulled together by draw latches 31. To support the closed doors from below, the lower pan 12 desirably carries a pair of forward-projecting still plates 32. The doors are secured in the closed position by means described below.

Figure 3:
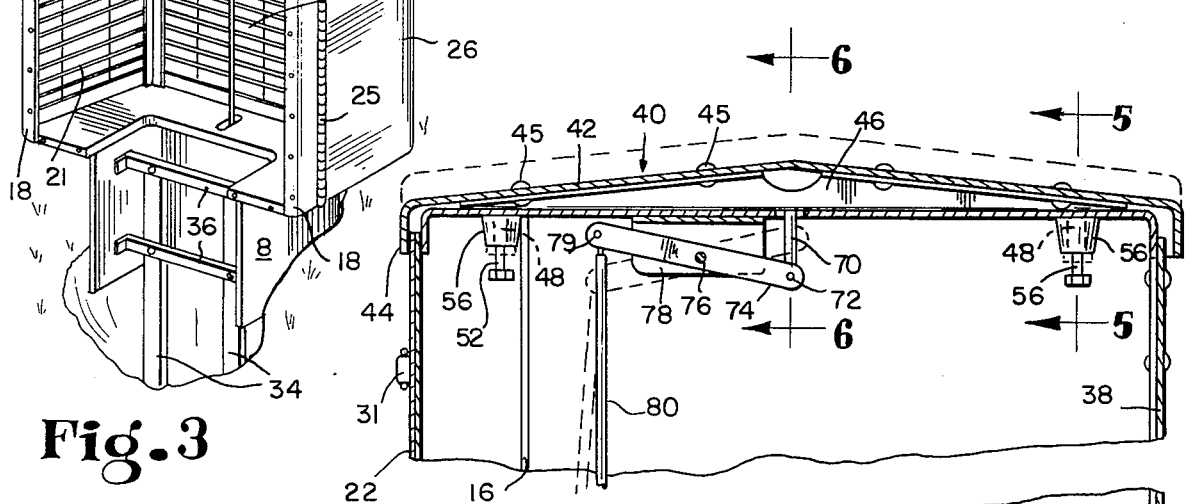
FIG. 3 is an isometric view showing the rear of a terminal housing as in FIGS. 1 and 2, but showing an alternative arrangement of terminal block panels within the housing.

As shown in FIG. 3, the rear of the lower pan 12 is cut out to provide a cable entrance opening which communicates with the interior of the hollow base 10. As here shown, the base is mounted on a pair of stakes 34 which carry two transverse cable clamp bars 36. The rear of the housing is open between the corner uprights 18, to provide access for installing cables and connecting them to the rear of the terminal blocks in the panels. Once the installation connections have been made, the rear opening may be closed by a closure plate 38 secured in place with semi-permanent fasteners such as rivets.

The terminal block panels 21 shown in FIG. 3 are in an alternative arrangement which may be used instead of the V-arrangement shown in FIG. 1. In such alternative, there are three terminal block panels 21, arranged in a generally U-shaped relationship, with a wide panel at the front of the housing and two narrower panels disposed angularly at the sides. Either arrangement provides full access through the rear of the housing to the rear faces of the several terminal block panels for making the desired cable connections to the terminals on such panels when the terminal housing is installed. Once installed, these cable connections are ordinarily not changed, and when they have been completed, it is contemplated that the rear panel 38 will be mounted in place and secured as by rivets to the upper and lower structural pans 12 and 14 and to the corner uprights 18. The rear of the base 10 is similarly closed by a rear closure section 9.

The top of the terminal housing carries a cover or cap 40 comprising an impervious top wall 42 and a peripherally-continuous depending flange 44 about its edge. The top wall is desirably slightly creased and dished to provide sloping surfaces to shed rain and to stiffen the cap as a whole. The under side of the cap wall 42 carries a central reinforcing rib 46 of inverted hat-section, with its flanges secured to the wall 42 by rivets 45, positioned as shown in FIG. 1. The cap is normally supported in a raised position as shown in FIG. 1 and in dotted lines in FIG. 4, in which its peripheral flange 44 lies above the top edges of the doors 22 and 24 and allows them to be swung open as shown in FIG. 1. When the doors are closed, the cap is moved downward to a closed position shown in FIG. 2 and in full lines in FIG. 4, in which its peripheral flange 44 overlaps the top edges of the closed doors, and this secures the doors in closed position and prevents entrance of water at their upper edges.

Figure 4:
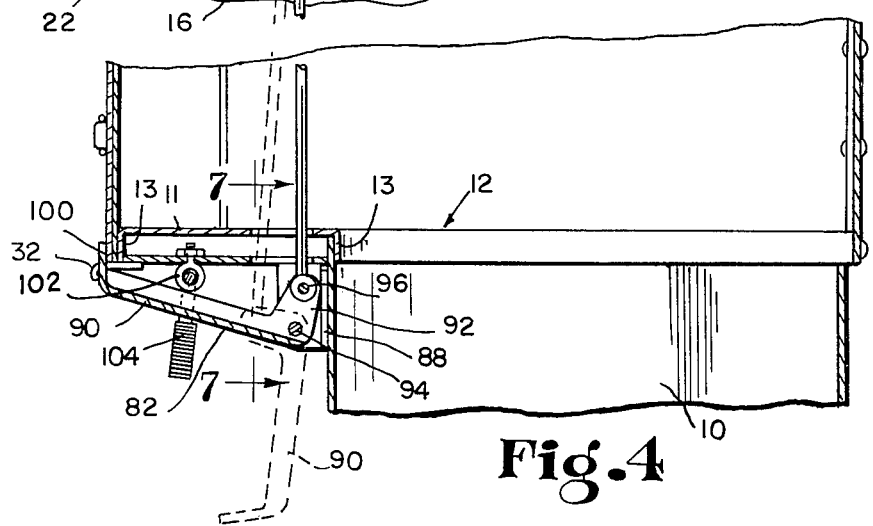
FIG. 4 is a vertical central section, taken on the central front-to-rear plane of FIG. 1, showing the cap in full lines in lowered position and in dotted lines in raised position.
Figure 5:
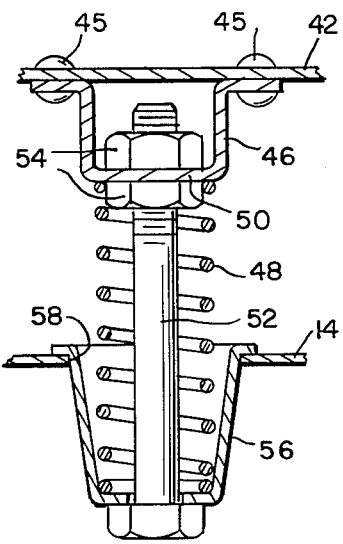
FIG. 5 is a section taken on the line 5—5 of FIG. 4, with the cap shown in raised position.

Desirably, and as shown in the drawings, the cap 42 is normally held in its raised position by resilient means, here shown as four compression springs located centrally of the four sides of the cap. As shown in FIGS. 4 and 5, two springs 48 are located at the opposite ends of the reinforcing rib 46 on the cap wall 42. The reinforcing rib 46 is a metal stamping of inverted hat-section, with a flat bottom wall 50. Adjacent each end of the rib, such bottom wall carries a depending guide bolt 52 secured to the rib by a pair of nuts 54 and extending downward through a central opening in a flanged, conical spring seat 56. The head of the bolt lies below the spring seat 56, and the spring is trapped between the seat 56 and the bottom wall 50 of the rib. Each seat is received in an opening 58 in the web of the upper pan 14, and is supported by such web. The seats serve as locators for the cap 40 and the bolts serve as guide posts to guide it for vertical movement between its raised and lowered positions.

Figure 6:
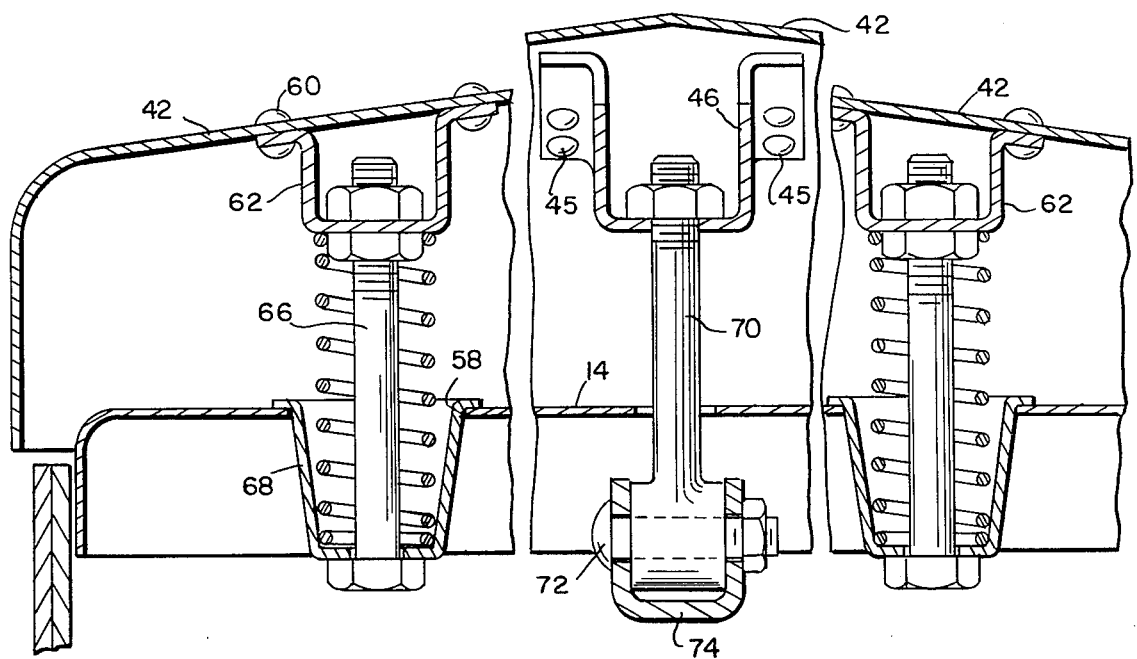
FIG. 6 is a section taken on the line 6—6 of FIG. 4, with the cap shown in raised position.

Two additional cap-supporting springs 60 are mounted adjacent the ends of the cap as shown in FIG. 6. Two hat-section brackets 62 are mounted against the underside of the cap wall 42, by means of rivets 64, and each bracket carries a guide post in the form of a bolt 66 secured in its web by nuts, and extending downward through a spring seat 68. The head of the bolt lies below the spring seat 68, and the spring 60 is trapped between the seat and the web of the bracket 62. As with the other spring seats 56, the seats 68 are fitted in located openings 58 in the supporting web of the top pan 14. The construction permits the several springs 48 and 60, their guide bolts 52 and 66 and their spring seats 56 and 68 to be assembled to the cap 40 in a sub-assembly which can be then mounted on the top pan 14 of the terminal housing by simply setting it in place.

To retain the cap in place and to move it between its raised and lowered positions, its central reinforcing rib 46 is connected to an eye bolt 70 shown in FIG. 6, which is connected by a bolt pin 72 to a linkage lever 74. Such lever 74 is pivoted on a fulcrum pin 76 in a bracket 78 fixed to the web of the top pan 14. The opposite end of the lever 74 is connected by a bolt pin 79 to the top end of a push rod 80, which extends downward to an actuating lever 82 mounted below the bottom pan 12 in front of the base 10. With this arrangement, the only linkage mechanism which extends across the terminal service space is the substantially-vertical, narrow push rod 80 and this is located on the back side of the terminal panels 20 at the apex of the V-arrangement.

Figure 7:
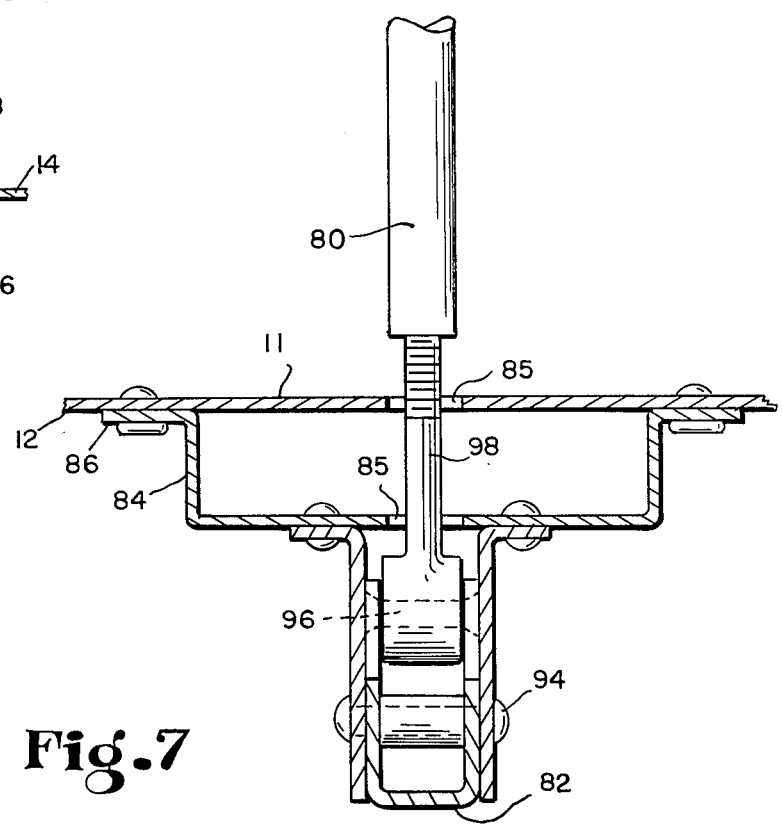
FIG. 7 is a section taken on the line 7—7 of FIG. 4.

The supporting structure for the actuating lever 82 is shown in FIGS. 4 and 7. The bottom pan 12 consists of a horizontal web 11 with a depending flange 13 extending about its periphery. The portion of the pan lying forward of the base 10 forms a downward-open wide channel shown in cross-section in FIG. 4. Within this wide channel, and extending between the front and rear flanges 13 thereof, there is mounted a wide, inverted hat-section mounting plate 84, which is secured by its side flanges 86 to the web 11 of the pan 12. The door-supporting sill plates 32 may be mounted on the web of the plate 84. The mounting plate 84 carries a depending fulcrum bracket 88 having spaced side-walls with out-turned ears at the top which are rivted to the bottom wall of the mounting plate 84. The actuating level 82 is a heavy sheet metal stamping of U-shaped section with a long operating arm 90 and a shorter crank arm 92 substantially at right angles to the operating arm 90. The lever is pivoted by a pivot pin 94 riveted to the side-walls of the fulcrum bracket 88 near its lower end. The crank arm 92 of the actuating lever 82 extends upward from the pivot 94 and is connected by a link pin 96 to a rod end member 98 which is threaded into the lower end of the push rod 80. The web 11 of the pan 12 and the web of the mounting plate contain apertures 85 to pass the push rod 80 and its rod end member 98.

The operation of the linkage is as follows. The springs 48 and 60 normally hold the cap 40 in its raised position as shown in dotted lines in FIG. 4, where it clears the doors 22 and 24 and allows them to be opened. In this position, the cap lifts the inner end of the linkage lever 74 and thrusts the rod 80 downward to its dotted line position (FIG. 4), and the actuating lever 82 hangs in its depending open position. To draw the cap 40 downward to its closed position, the actuating lever 82 is manually swung foward toward its closed position shown in full lines in FIG. 4. This causes its crank arm 92 to thrust the push rod 80 upward, which raises the outer end of the lever 74 and lowers the inner end thereof, and this pulls down on the eye bolt 70 attached to the cap 40 and pulls that cap downward to its lowered position shown in full lines in FIG. 4. As the crank arm 92 approaches its final position, it passes a dead center position on the center line between the lever pivot 94 and the link pin 79 by which that rod is connected to the lever 74. After it passes that dead center position, the action of the springs 48 and 60, urging the cap upward, exert downward force on the push rod 80 to carry the crank arm 92 of the actuating lever beyond dead center and urge the operating arm 90 upward to its full line position. The actuating lever is then held by this over-center action in closed position as shown in full lines in FIGS. 2 and 4.

The outer end of the operating arm 90 desirably carries a latch finger 100 which swings between the sill plates 32 and into latching engagement with the overlapping edge portions of the two doors 22 and 24, so that when the cap 40 is pulled down to cause its peripheral flange to secure the doors at the top, the operating arm 90 by which such action is effected carries its latch finger 100 into securing engagement with the lower edges of the doors.

For locking the terminal housing in closed condition, the mounting plate 84 carries an eye bolt 102 having its eye disposed immediately above the operating arm 90 when that arm is in its closed position, so that the arm may be locked in closed position by a padlock 104 engaged in the eye bolt 102.

In use, the terminal housing is mounted by its base 10 on a suitable pad or on stakes as shown in FIG. 3. Underground cables are brought up through the base 10 and the rear access opening in the lower pan 12, and are connected as desired to the cable connectors at the rear face of the terminal block panels. When such installation connections have been completed, the rear of the base and the terminal housing are closed by the installation of the rear base panel 9 and the rear closure plate 38, as by means of draw rivets or other semi-permanent fasteners. The terminal housing is then ready for service connections to be made at the front face of the terminal block panels. As shown in FIG. 1, the entire front face of these panels is fully exposed by opening the two doors 22 and 24. When the desired service connections have been completed, the doors 22 and 24 are closed. This carries their upper and lower edges against the depending peripheral flanges of the upper pan 14 and the lower pan 12, and places the meeting edges of the doors in overlapping relation at the center front of the housing. As the doors are moved to closed position they ride up on the sill plates 32 and in closed position are supported from below by such plates. During the time the doors are open, the cap 40 is supported in its raised position by the springs 48 and 60, where its peripheral flange lies above the level of the top edges of the doors and clears those edges to permit the doors to be opened and closed. When the doors have been closed, the operating handle 90 is then manually moved from its depending open position shown in dotted lines in FIG. 4 to its closed position shown in full lines in FIG. 4. The linkage then operates as described above, to draw the cap downward to its lowered position and place its peripheral flange in overlapping relation with the doors to secure them closed at the top. The lever arm 90 moves to closed position where its latch finger latches the doors closed at the bottom. A padlock is then applied to the eye bolt 102 to lock the lever 90 in closed position and thereby lock the cap 40 in its down position. The housing is opened by removing the padlock and manually swinging the actuating arm 90 downward and rearward. This raises the cap and allows the doors to be swung open.

I claim:

1. A terminal housing comprising
   frame structure including top and bottom structure and corner members extending therebetween at the rear corners of the housing, said structure leaving the front and sides of the housing substantially open, and including means to mount one or more terminal panels between the top and bottom frame structure and extending generally forward in a horizontally arched configuration from the rear corner members so as to present the front faces of the panels toward the front and sides of the housing,
   doors hinged to said frame structure adjacent said rear corner members, said doors having a closed position in which they extend forward from said corner members across the open sides and front of the housing to form a peripherally continuous front and side enclosure between the top and bottom frame structure to cover the exposed front faces of the terminal panels, said doors being movable outward to expose substantially the entire front face area of the panels for service access,
   a cap overlying said top frame structure and having a top closure wall and a depending peripheral flange,
   spring means acting between said top frame structure and said cap and normally supporting the cap in a raised position in which its peripheral flange clears the tops of the doors to permit the doors to be opened to expose the terminal panels,
   said cap being movable downward from said raised position, against the force of the springs, to a lowered closure position in which its peripheral flange overlaps the tops of the closed doors to secure the same in closed position and close the top of the housing against the weather,
   guide means for guiding the cap for movement between said raised and lowered positions,
   actuating means connected to the cap for moving the same from its spring-supported raised position to its closure position, said actuating means including a lever which moves past dead center against the force of said spring means so as to secure the cap in its lowered closure position.

2. A terminal housing as in claim 1 in which said actuating means includes linkage extending to the bottom frame structure and said over-center lever is pivoted on such structure.

3. A terminal housing as in claim 2 in which said over-center lever includes latch means which in the cap-securing position of the lever engages the bottom of a door to secure such bottom in door-closed position.

4. A terminal housing as in claim 1 in which said guide means comprise vertical posts mounted on one of the cap and the top frame structure, and said spring means comprise compression springs mounted about the guide posts and acting to urge the cap away from the top frame structure.

* * * * *